United States Patent
Saes et al.

(10) Patent No.: US 11,626,793 B2
(45) Date of Patent: Apr. 11, 2023

(54) LED DRIVER AND METHOD OF OPERATING AN LED DRIVER

(71) Applicant: Eldolab Holding B.V., Son en Breugel (NL)

(72) Inventors: Marc Saes, Son en Breugel (NL); Franciscus Bernardus Marie Van Horck, Son en Breugel (NL)

(73) Assignee: eldoLAB Holding B.V., Son en Breugel (NL)

( * ) Notice: Subject to any disclaimer, the term of this patent is extended or adjusted under 35 U.S.C. 154(b) by 384 days.

(21) Appl. No.: 17/041,796

(22) PCT Filed: Mar. 26, 2019

(86) PCT No.: PCT/NL2019/050189
§ 371 (c)(1),
(2) Date: Sep. 25, 2020

(87) PCT Pub. No.: WO2019/190317
PCT Pub. Date: Oct. 3, 2019

(65) Prior Publication Data
US 2021/0051783 A1   Feb. 18, 2021

(30) Foreign Application Priority Data
Mar. 28, 2018   (NL) ..................... 2020675

(51) Int. Cl.
*H02M 1/42*   (2007.01)
*H05B 45/3725*   (2020.01)
(Continued)

(52) U.S. Cl.
CPC ....... *H02M 1/4208* (2013.01); *H02M 3/1588* (2013.01); *H05B 45/3725* (2020.01);
(Continued)

(58) Field of Classification Search
CPC .............. H02M 1/4208; H02M 3/1588; H05B 45/3725
See application file for complete search history.

(56) References Cited

U.S. PATENT DOCUMENTS 7,759,881 B1 * 7/2010 Melanson .......... H05B 45/3725
 315/293
10,251,231 B1 * 4/2019 DeJonge ............ H05B 45/3725
(Continued)

FOREIGN PATENT DOCUMENTS

EP   2315497 A1   4/2011
EP   2603058 A2   6/2013

OTHER PUBLICATIONS

International Search Report for International Application No. PCT/NL2019/050189, dated Jun. 11, 2019, 4 pages.
(Continued)

*Primary Examiner* — Kyle J Moody
(74) *Attorney, Agent, or Firm* — RatnerPrestia (57) ABSTRACT

An LED driver is described, the LED driver comprising:
a back end module BE comprising a switch mode power converter SMPS configured to operate in a self-oscillating current control mode, the back end module BE further comprising:
an input terminal configured to receive a DC bus voltage;
an output terminal configured to output a supply current for powering an LED fixture;
a control unit configured to control the back end module to operate the SMPS in a voltage control mode by:
determining a switching frequency of the SMPS when operating in the self-oscillating current control mode;
(Continued)

determining a minimal switching frequency of the SMPS and receiving an input signal representative of the supply current for powering the LED fixture;

wherein the control unit is further configured to control the switch of the SMPS in the voltage control mode by:

operating the switch of the SMPS at a substantially constant frequency based on the determined minimal switching frequency and modulating a duty cycle of the switch to maintain the supply current at a desired current.

28 Claims, 3 Drawing Sheets

(51) Int. Cl.
*H02M 3/158* (2006.01)
*H05B 45/375* (2020.01)
*H05B 45/38* (2020.01)
*H02M 1/00* (2006.01)

(52) U.S. Cl.
CPC ........... *H02M 1/007* (2021.05); *H05B 45/375* (2020.01); *H05B 45/38* (2020.01)

(56) References Cited

U.S. PATENT DOCUMENTS

| | | |
|---|---|---|
| 10,314,129 B2 * | 6/2019 | Kober .................... H02M 1/36 |
| 10,405,383 B2 * | 9/2019 | Van Kaathoven ... H05B 45/325 |
| 2007/0188114 A1 | 8/2007 | Lys et al. |
| 2018/0014373 A1 | 1/2018 | Song et al. |

OTHER PUBLICATIONS

Netherlands International Search Report and Written Opinion for International Application No. 2020675, dated Sep. 25, 2018, 12 pages.

P. Lan and P. Huang, "A High Efficiency FLL-Assisted Current-Controlled DC-DC Converter Over Light-Loaded Range," in IEEE Transactions on Circuits and Systems I: Regular Papers, vol. 59, No. 10, pp. 2468-2476, Oct. 2012, doi: 10.1109/TCSI.2012.2188937.

* cited by examiner

LED DRIVER AND METHOD OF OPERATING AN LED DRIVER

RELATED APPLICATIONS

This application is a U.S. National Phase Patent Application of International Application No. PCT/NL2019/050189, filed Mar. 26, 2019, which claims priority to Netherlands Application No. NL 2020675, filed Mar. 28, 2018, the disclosures of which are incorporated herein by reference in their entirety for all purposes.

FIELD OF THE INVENTION

The invention relates to the field of LED drivers and more specifically to the field of switched mode power supplies as applied in such LED drivers.

BACKGROUND OF THE INVENTION

The present invention relates to the field of lighting applications, in particular to LED based lighting applications. Such lighting applications comprise one or more LEDs or LED groups that are typically powered by an LED driver. Such an LED driver may e.g. comprises a front end module that is configured to e.g. receive a mains supply voltage and convert it to a DC supply voltage, also referred to as a DC bus voltage. The LED driver may further comprise a back end module, e.g. comprising a switched mode power converter, whereby the back end module is configured to receive the DC bus voltage as input and output a DC supply voltage and a current for powering the one or more LEDs or LED groups.

Compared to convention lighting, LED based lighting applications are far more efficient. However, there is a continuous need to improve the efficiency of LED drivers that are used to power such LED based lighting applications.

SUMMARY OF THE INVENTION

It would be desirable to provide in a more efficient LED driver. To better address one or more of these concerns, in a first aspect of the invention, an LED driver is provided, the LED driver comprising:
  a back end module comprising a switch mode power converter SMPS configured to operate in a self-oscillating current control mode, the back end module further comprising:
    an input terminal configured to receive a DC bus voltage;
    an output terminal configured to output a supply current for powering an LED fixture;
    a control unit configured to control the back end module to operate the SMPS in a voltage control mode by:
      determining a switching frequency of the SMPS when operating in the self-oscillating current control mode;
      determining a minimal switching frequency of the SMPS and
      receiving an input signal representative of the supply current for powering the LED fixture;
    wherein the control unit is further configured to control the switch of the SMPS in the voltage control mode by:
      operating the switch of the SMPS at a substantially constant frequency based on the determined minimal switching frequency and
      modulating a duty cycle of the switch to maintain the supply current at a desired current.

By means of the LED driver according to the present invention, switching losses occurring in the SMPS of the back end module can be mitigated, thus enabling to operate the LED driver at an improved efficiency.

In an embodiment, the LED driver further comprising a front end module configured to convert a mains supply voltage to a DC bus voltage.

In an embodiment, the LED driver may be configured to comprise a cascaded arrangement of power converter, e.g. an arrangement of a front end module converting a mains power supply to a DC power supply and a back end module converting the DC power supply to a power supply for powering the load, e.g. an LED fixture comprising one or more LEDs.

In accordance with the present invention, the LED driver comprises a back end module that comprises a switch mode power converter SMPS that is configured to operate in a self-oscillating current control mode.

When operating in a self-oscillating current control mode, a switch of the switch mode power converter SMPS of the back end module may be controlled based on a comparison of a current set point, also referred to as a desired current or desired current value, and a current measurement representing the supply current or LED supply current, i.e. the current as supplied to the load, e.g. an LED fixture comprising one or more LEDs.

In accordance with the present invention, the control unit of the LED driver may e.g. be configured to receiving an input signal representative of a desired current value for the LED supply current for powering the LED fixture, and to control the switch mode power converter SMPS to operate in the self-oscillating current control mode, based on the input signal.

In accordance with the present invention, the control unit of the LED driver is further configured to control the back end module to operate the SMPS in a voltage control mode by:
  determining a switching frequency of the switch of the SMPS when operating in the self-oscillating current control mode;
  determining a minimal switching frequency of the switching frequency of the SMPS.

Based on this determined minimal switching frequency, the control unit may then further be configured to control the switch of the SMPS in the voltage control mode by:
  operating the switch of the SMPS at a substantially constant frequency based on the determined minimal switching frequency and
  modulating a duty cycle of the switch to maintain the LED supply current at the desired current value.

By doing so, the control unit has control over the applied switching frequency of the switch of the SMPS, thus enabling an improved control over the occurring switching losses.

In a second aspect of the present invention, a method of operating an LED driver is provided, the LED driver comprising a back end module comprising a switched mode power converter SMPS, the back end module being configured to receive, at an input terminal, a DC bus voltage and configured to output, via an output terminal, a supply current for powering an LED fixture, the method comprising:
  observing a switching frequency of the SMPS when operating in a self-oscillating current control mode and identifying a minimal switching frequency and a current level of the supply current supplied via the output terminal;
  controlling the switching frequency of the SMPS to a substantially constant switching frequency based on the minimal switching frequency and modulating a duty cycle of the SMPS, so as to maintain the supply current as supplied by SMPS to the current level.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
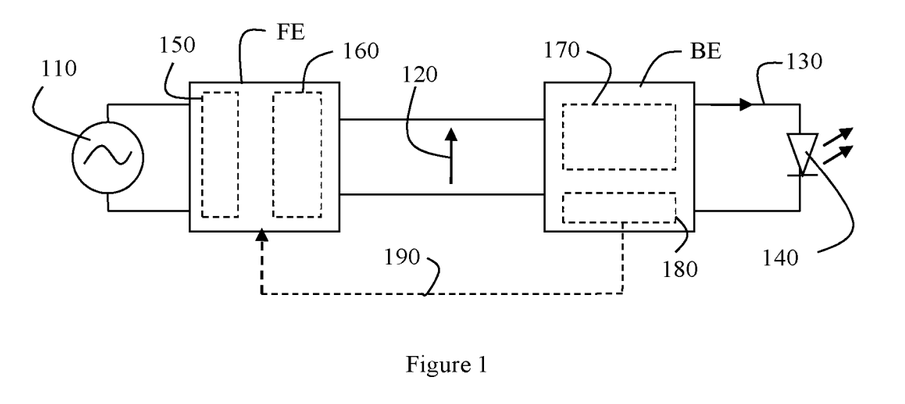
FIG. 1 depicts an LED driver according to an embodiment of the present invention.

FIG. 1 schematically depicts an LED driver according to an embodiment of the present invention.

In the embodiment as shown, the LED driver 100 comprises front end module FE configured to receive a supply voltage such as a mains supply voltage 110 and convert the supply voltage to a bus voltage 120, also referred to as a DC bus voltage. The LED driver 100 according to the present invention further comprises a back end module BE configured to receive the DC bus voltage and output a supply current 130 to a load, e.g. an LED fixture 140 comprising one or more LEDs or LED groups. In accordance with the present invention, the supply current may also be referred to as the LED supply current, i.e. the current that is supplied to the LED fixture comprising the one or more LEDs or LED groups.

In an embodiment, the LED driver may comprise more than one back end module BE, e.g. two or more. In such arrangement, the plurality of back end modules may all be supplied by the same DC bus voltage, while each back end module can convert this DC bus voltage to a required supply current for powering a particular load.

In accordance with the present invention, the back end module BE comprises a switch mode power converter (SMPS) 170, e.g. a Buck or Boost or hysteretic converter. In an embodiment, such a back end module may be configured to operate in a first operating mode, referred to as a self-oscillating mode or self-oscillating current control mode, whereby a switch of the switch mode power converter is controlled based on a comparison of a current set point, also referred to as a desired current or desired current value, and a current measurement representing the supply current or LED supply current, i.e. the current as supplied to the load, e.g. an LED fixture comprising one or more LEDs. Such a control can e.g. be realized by means of a comparator or comparator circuit, the comparator receiving as input the current set point or a signal representative thereof and a signal representative of the actual supply current. Based on a comparison of both inputs or input signal, the comparator may generate a control signal controlling the switch of the switch mode power converter to close or open.

In an embodiment, the front end module FE may e.g. comprise a rectifier 150 for rectifying a received supply voltage 110, e.g. a full bridge or half bridge rectifier, thus generating a DC bus voltage that is used as a supply voltage for the back end module BE. Typically, such a DC bus voltage will comprise a voltage ripple, e.g. at twice the frequency of the applied supply voltage that is rectified. As a result of such a voltage ripple on the supply voltage of the back end circuit BE, the switching frequency of the switch of the switch mode power converter, when operating in the self-oscillating mode, will vary, in accordance with the voltage ripple.

In an embodiment, the front end module may further comprise a PFC circuit 160.

In accordance with the present invention, the LED driver further comprises a control unit 180 that is configured to control the switch mode power converter 170 to operate in a second operating mode, different from the self-oscillating mode.

In an embodiment of the present invention, the control unit 180 of the LED driver may be configured to also control the bus voltage 120 as provided by the front end module FE to the back end module BE, as indicated by the dotted arrow 190. Such control may be realized by controlling the rectifier 150 applied in the front end module (in case of a half-bridge or full-bridge rectifier), by controlling the PFC circuit 160 or both.

In the second operating mode, the control unit controls the switch of the switch mode power converter at a substantially constant frequency, while modulating the duty cycle of the switch so as to maintain a substantially constant supply current, corresponding to a required or desired current, as e.g. indicated by a current set point.

In order to switch from operating in the first operating mode, i.e. the self-oscillating mode, to the second operating mode, also referred to as a voltage controlled mode, the control unit of the LED driver may be configured to disable the comparator to control the switch of the switch mode power converter, or, phrased differently, the control unit may be configured to take over the control of the switch. As such, after a transition from operating in the first operating mode to operating in the second operating mode, the switch of the switch mode power converter of the back end mode BE will receive a control signal from the control unit rather than from the comparator.

In an embodiment of the present invention, the control unit may be configured to control the LED driver to start operating in the second operating mode when certain, e.g. predefined conditions are met. Such conditions may e.g. be the absence of a modified illumination set point as e.g. received by the control unit during a predetermined period of time. As an example, the control unit may e.g. be configured to control the LED driver when the desired illumination set point, as e.g. provided via a user interface to the control unit, has not been changed during a few seconds, e.g. 10 seconds. As will be made clear further on, by operating in the voltage control mode, switching losses occurring in the LED driver may be reduced, thus resulting in a more efficient operation.

Alternatively, or in addition, the control unit may be configured to control the LED driver to start operating in the second operating mode when a particular control signal is received by the control unit, e.g. a control signal or command to transition to operate in the second operating mode. Such a control signal or command may e.g. be provided by a user interface which is used to control the illumination characteristic, e.g. color and/or intensity, of the LED fixture that is powered. Such a control signal or command may be referred to as a user command.

In an embodiment of the present invention, the control unit may also be configured to, when operating in the voltage control mode, enable the LED driver to start operating in the self-oscillating mode again, when certain conditions are met. As an example, the receipt by the control unit of a new illumination set point, e.g. indicative of a new desired illumination characteristic may result in the control unit releasing the control again. Such a transition from operating in the voltage control mode to operating in the self-oscillating mode should preferable occur comparatively fast, e.g. within a few milliseconds, e.g. 1 or 2 msec.

Figure 2:
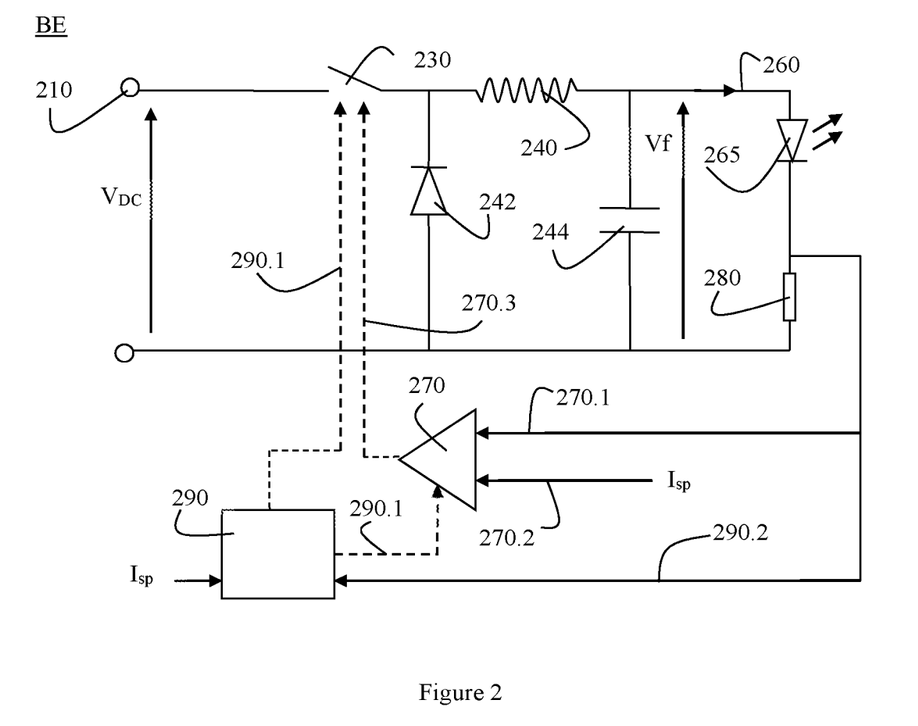
FIG. 2 depicts a back end module of an LED driver according to an embodiment of the present invention.

FIG. 2 schematically shows a more detailed embodiment of a back end module as can be applied in an LED driver according to the present invention.

The back end module BE as schematically shown comprises an input terminal 210 for receiving a DC bus voltage $V_{DC}$. The back end module BE further comprises a switch mode power converter (SMPS), a Buck converter in the embodiment as shown, comprising a switch 230, also referred to as a power switch, an inductor 240, a diode and a capacitor 244. The SMPS is configured to supply a supply current or LED supply current 260 to a load 265, e.g. an LED fixture comprising one or more LEDs. In the embodiment as shown, the back end module BE further comprises a comparator 270, the comparator 270 being configured to receive a first input signal 270.1 representative of the LED supply current 260, e.g. a voltage across a resistor 280 receiving the supply current 260, and a second input signal 270.2 representative of a desired current, e.g. a current set point $I_{sp}$ derived from a desired illumination characteristic of the LED fixture.

In the embodiment as shown, the comparator 270 is configured to generate an output signal 270.3 for operating the switch 230 of the SMPS, based on a difference between the first input signal and the second input signal. The operating mode of the SMPS, whereby the comparator 270 controls the operating state of the switch 230 is referred to, within the meaning of the present invention, as the self-oscillating mode or self-oscillating current control mode.

In such a self-oscillating mode, there is no need to perform any calculations to arrive at the appropriate control signal 270.3 for controlling the operating state of the switch 230. Rather, the switch 230 is directly controlled by the difference between both input signals 270.1 and 270.2. The comparator does not provide in an actual control of the switching frequency or the on- or off-time of the switch 230, these parameters, i.e. switching frequency or on- or off-time, also referred to as duty cycle, merely depend on the components use, the desired output characteristic and the input voltage, i.e. the DC bus voltage $V_{DC}$. Typically, the DC bus voltage $V_{DC}$, as e.g. provided by a front end module FE of the LED driver, will contain a voltage ripple or modulation, e.g. a 100 Hz or 120 Hz ripple depending whether the front end circuit is supplied from a 50 Hz mains supply or a 60 Hz mains supply. When the SMPS is operating in the self-oscillating mode, also referred to as a self-oscillating current control mode, while the SMPS is supplied with an input voltage or supply voltage that contains a ripple or variation, e.g. a 100 Hz or 120 Hz ripple, one can observe that the switching frequency of the switch 230 of the SMPS will typically vary as well, e.g. between a minimum and a maximum frequency.

Within the meaning of the present invention, the switching frequency of a switch 230 of the SMPS may e.g. be associated with the sequence of opening instants or the sequence of closing instants of the switch or power switch 230 of the SMPS. Within the meaning of the present invention, a duty cycle may further be defined as the period during which the switch 230 is closed or open, compared to the switching period, the switching period being the period between two consecutive openings or two consecutive closings of the switch, the switching period thus being the inverse of the switching frequency.

When operating in a self-oscillating mode and being supplied by the varying supply voltage, one can typically observe that the duty cycle of the switch varies as well, e.g. between a maximum duty cycle, occurring at the minimum switching frequency, and a minimum duty cycle, occurring at the maximum switching frequency.

Figure 3:
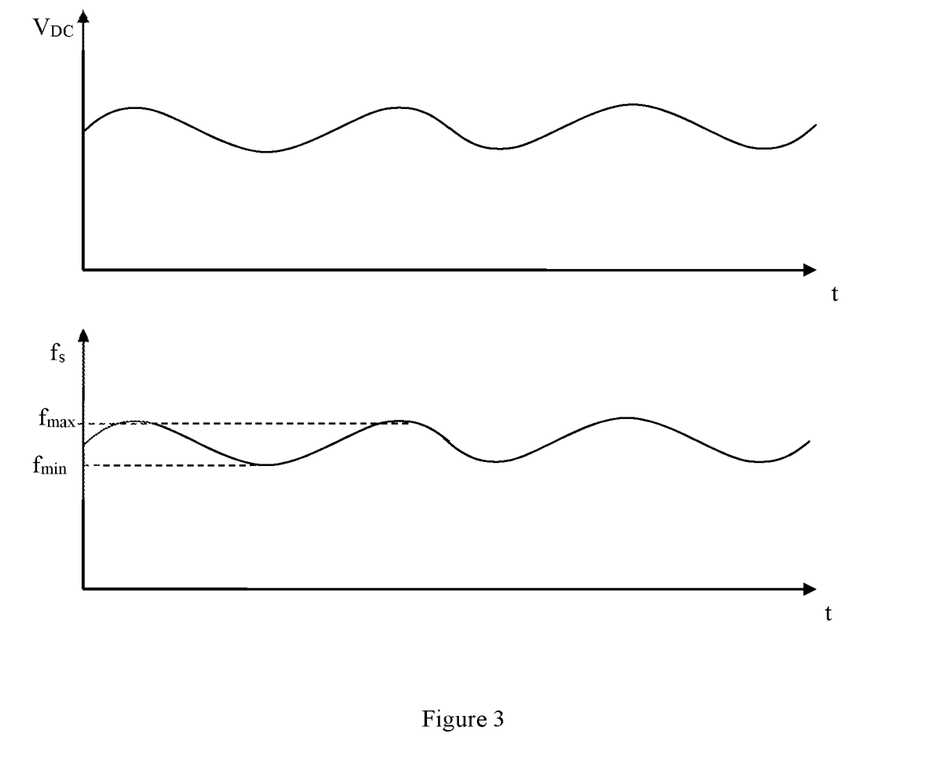
FIG. 3 depicts a DC bus voltage and associated switching frequency in a self-oscillating mode.

FIG. 3 schematically illustrates, in the upper graph, a DC bus voltage $V_{dc}$ as can be applied to supply the back end module of the LED driver according to the present invention and, in the lower graph, the switching frequency $f_s$ of the switch 230 of the SMPS, when operating in the self-oscillating mode. As can be seen, the DC bus voltage as provided is not constant but rather comprises a voltage ripple, e.g. a ripple occurring at 100 Hz or 120 Hz.

As a result of this voltage ripple, the switching frequency $f_s$ of the switch 230 of the SMPS will vary between a maximum switching frequency $f_{max}$ and a minimum switching frequency $f_{min}$.

An advantage of operating in the self-oscillating mode is that no computations or calculations are required to maintain the supply current as supplied to the load at a desired level.

A disadvantage of operating in the self-oscillating mode is that the switching frequency of the SMPS is not controlled, but is dictated or determined by the applied components. As such, the switching losses associated with the switching of the switch during the self-oscillating mode cannot be controlled either. In this respect, it can be mentioned that these switching losses may be substantial because the switching frequency of the switch during the self-oscillating mode may be comparatively high, e.g. >100 kHz, e.g. ~300 kHz.

In accordance with the present invention, the LED driver according to the present invention is configured to operate in a second operating mode, whereby the switching frequency and thus the associated switching losses may be controlled.

In order to realize this, the LED driver according to the present invention further comprises a control unit, configured to control the LED driver to operate in a second operating mode.

Referring back to FIG. 2, in the embodiment as shown, the back end module BE further comprises a control unit 290, which can e.g. be embodied as a processing unit or processor, e.g. comprising an FPGA, a microprocessor or microcontroller or the like. In the embodiment as shown, the control unit 290 is configured to take over or overrule the control of the switch 230, whereby the switch 230 is controlled by a control signal 290.1 as generated by the control unit 290, rather than by the output signal 270.3 of the comparator 270. By doing so, a transition from operating in the first operating mode to operating in the second operating mode can be realized.

In accordance with the present invention, such a transitioning may be realized in various manners.

In an embodiment, the comparator 270 may be controlled by an enable/disable signal, schematically indicated by the arrow 290.1. In such case, one can control the output of the comparator 270 by:

providing a control signal Isp (reference number 270.2) having such a high value that the corresponding output 270.3 of the comparator 270 would be high, irrespective of the current signal 270.1, and controlling the output of the comparator by the enable/disable signal 290.1, i.e. when the comparator 270 is enabled, the output 270.3 will be high, and when the comparator 270 is disabled, the output 270.3 will be low.

By doing so, the control unit 290 may have control of the switch 230.

In another embodiment, the switch 230 may be controlled by controlling the current set point Isp as supplied to the comparator 270; by setting this current set point to a high value, higher than the actual current as represented by the signal 270.1, the output 270.3 of the comparator 270 would become high, whereas by setting this current set point to a low value, lower than the actual current as represented by the signal 270.1, the output 270.3 of the comparator 270 would become low. As such, the control unit 290 may actually take control of the switch 230 by control of the current set point Isp, represented by the signal 270.1.

In accordance with the present invention, the control unit 290 is configured to control the SMPS to operate in a second operating mode, referred to as a voltage controlled mode. In an embodiment of the present invention, the control unit of the LED driver is configured to operate the LED driver in the second operating mode, thereby controlling the switch of the SMPS to operate at a substantially constant frequency, whereby said substantially constant frequency is based on the minimum frequency that is determined during operation of the SMPS in the first operating mode, i.e. the self-oscillating current control mode.

By operating the switch of the SMPS at a substantially constant frequency, e.g. corresponding to or lower than the minimum switching frequency occurring when the SMPS is operated in the self-oscillating mode, the switching losses of the SMPS can be reduced, thus enabling the LED driver to operate at an improved efficiency.

When operating in a self-oscillating mode and being supplied by the varying supply voltage, one can typically observe that the duty cycle of the switch varies as well, e.g. between a maximum duty cycle, occurring at the minimum switching frequency, and a minimum duty cycle, occurring at the maximum switching frequency.

As already indicated above, the actual values of the switching frequencies and duty cycles as they occur when the SMPS operates in the self-oscillating mode will typically depend on various factors or parameters, such as the components used, the topology of the SMPS, the comparator characteristics such as delay, the required supply current and the supply voltage supplied to the back end module BE.

Note that during the operation in the self-oscillating mode, the applied instantaneous switching frequency and duty cycle are a response to the difference between the desired current and the actual current, said difference e.g. being used by a comparator to control the switch of the SMPS.

When operated in the second operating mode, the control unit of the LED driver takes over the control of the switch, e.g. by disabling the comparator to control the switch. In view of the above, the control unit should thus, when doing so, apart from controlling the switching frequency of the switch, also control the duty cycle at which the switch is operated. In particular, the control unit of the LED driver according to the present invention is configured to control the duty cycle at which the switch is operated in such manner that the supply current or LED supply current as generated substantially corresponds to the desired current, e.g. derived from a desired illumination set point obtained from a user interface, irrespective of the occurring variation of the SMPS supply voltage.

In an embodiment, the duty cycle may be adjusted in a substantially continuous manner. Alternatively, the duty cycle may be adjusted at predetermined instants.

In an embodiment of the present invention, use is made of a mathematical model of the SMPS to determine, for a given supply voltage and supply voltage variation and for a selected substantially constant switching frequency, the duty cycle at which the switch of the SMPS should be operated in order to obtain a supply current that is substantially constant and corresponds to the desired or required supply current. In an embodiment, the duty cycle as applied may e.g. be selected to be proportional to the ratio $Vf/V_{DC}$. Since the DC bus voltage may vary, e.g. may comprise a voltage ripple, the duty cycle may have to be varied over time as well, e.g. according to the indicated ratio.

In an embodiment, the control unit may therefore receive, as an input signal, a forward voltage signal representing the forward voltage Vf across the LED or LEDs that are powered and/or a DC bus voltage signal representing the DC bus voltage. Such voltage signals may e.g. be obtained using a voltage divider. Such a voltage divider may e.g. comprise a series connection of resistors.

In case such ratio would not result in the required supply current to the load, i.e. the LED fixture, a correction may be used. Such a correction may e.g. be empirically determined and may also vary over time.

As such, the applied duty cycle D(t) may e.g. be expressed as:

$$D(t)=\alpha(t)*Vf/V_{DC}(t) \quad (1)$$

Whereby α(t) corresponds to a correction applied in case the supplied current does not correspond to the desired current. The required correction α(t) may e.g. be determined based on a current measurement, e.g. obtained from a voltage across a resistor 280 in series with the load.

In an embodiment, the required duty cycle modulation or duty cycle variation may be determined empirically. This may e.g. be done in advance, e.g. during a calibration procedure. In such embodiment, an empirical model or an empirically derived look-up table may be devised and e.g. stored in the control unit or accessible by the control unit. Such a look-up table may e.g. applied to determine the required duty cycle D for a given set of circumstances and/or requirements.

In an embodiment of the present invention, the control unit may comprises one or more look-up tables indicating the required duty cycle as a function of the supply voltage, i.e. the DC bus voltage of the SMPS and the required supply current, at particular switching frequencies.

Note that the above indicated model, whereby the ratio $Vf/V_{DC}$ is used, may also be embodied in a lookup table. By doing so, one can avoid that the processing unit or control unit needs to calculate the ratio $Vf(t)/V_{DC}$.

In an embodiment, the control unit of the LED driver according to the present invention is further configured to control the front end module FE, thereby controlling the DC bus voltage as supplied to the back end module BE.

In an embodiment of the present invention, the control unit is configured to, when operating in the voltage control mode, reduce the DC bus voltage $V_{DC}$ as supplied to the back end module BE. When doing so, a further efficiency improvement of the LED driver can be obtained. In particular, the efficiency of the back end module BE will be improved in case the difference between the DC bus voltage $V_{DC}$ and the output voltage Vf, see FIG. 2, is reduced. This voltage difference between the DC bus voltage and the output voltage Vf may also be referred to as the headroom.

When this headroom is reduced, the switching frequency as controlled by the control unit when operating in the voltage control mode, may also be reduced further. When doing so, the duty cycle at which the switch of the SMPS is operated should be increased, in order to maintain the supply current as supplied to the load 270, i.e. an LED fixture.

As will be appreciated by the skilled person, by reducing the headroom and decreasing the switching frequency as controlled by the control unit 290, a further reduction of the switching losses can be obtained.

In an embodiment of the present invention, the duty cycle as applied is only adjusted on a number of predefined instants. As an example, it is assumed that the front end module FE of the LED driver according to the present invention is supplied from a 50 Hz mains supply voltage. As such, the supply voltage of the back end module, in particular the SMPS of the back end module will contain a 100 Hz ripple or 100 Hz voltage variation, i.e. a variation or ripple having a 10 ms period.

In an embodiment of the present invention, this ripple period is subdivided in a plurality of sub-periods, e.g. 10 sub-periods. Rather than substantially continuously varying the duty cycle during the ripple period, the control unit of the present invention may, in an embodiment, determine a duty cycle for each of the 10 sub-periods and control the SMPS accordingly. In such embodiment, the duty cycle as applied is only adjusted every 1 ms. This is illustrated in FIG. 4.

Figure 4:
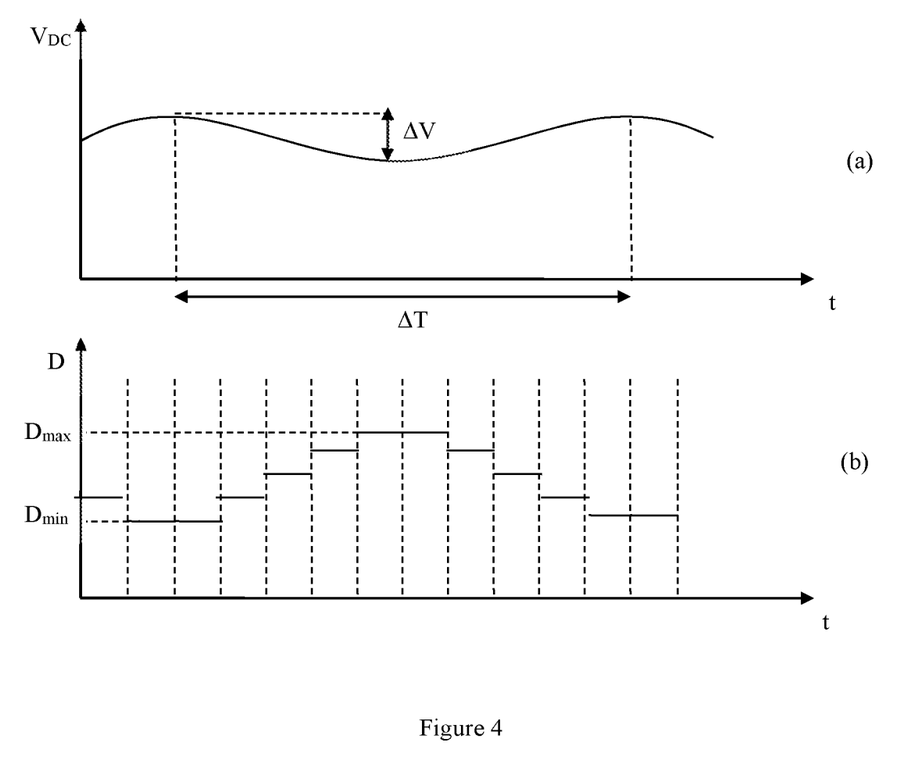
FIG. 4 depicts a DC bus voltage and associated duty cycle variation in a voltage controlled mode.

Graph (a) of FIG. 4 schematically shows a DC bus voltage $V_{DC}$ as can be provided by a front end module FE of an LED driver according to the present invention, the DC bus voltage having a voltage ripple $\Delta V$ with a period $\Delta T$ of 10 ms.

Graph (b) of FIG. 4 illustrates the subdivision of the period $\Delta T$ in 10 sub-periods and the duty cycle D applied in the different sub-periods. As can be seen, the duty cycle D (e.g. the percentage of on-time during a period of the switching frequency that is applied in the voltage control mode) is varied between a maximum value $D_{max}$, occurring when the DC bus voltage is at its lowest and a minimum value $D_{min}$, occurring when the DC bus voltage is at its highest. The required values for the duty cycles D to be applied in the different sub-periods can be determined based on a mathematical model of the SMPS, an empirical model, actual current measurements or a combination thereof. In general, a period $\Delta T$ may thus be subdivided into N sub-periods, N being an integer number >1. The sub-periods may be of equal duration or may have a different duration. The number of sub-periods N may e.g. be based on the period $\Delta T$ or may be predetermined. The duration of a sub-period may be selected by the control unit, e.g. based on the period $\Delta T$, or may be predetermined. In an embodiment of the present invention, the control unit 290 of the LED driver is further configured to receive an input signal 290.2 representative of the actual current that is supplied to the load. In the embodiment shown in FIG. 2, the input signal 290.2 is the same as the input signal 270.1 representative of the supply current 260, e.g. a voltage across a resistor 280 receiving the supply current 260. Such a signal may e.g. be used as a feedback signal to check whether or not the generated current, represented by the signal, corresponds to the desired current. In case there is a mismatch, the control unit may be configured to adjust the duty cycles to be applied in the sub-periods, so as to more closely obtain the desired supply current.

In an embodiment of the present invention, the control unit of the LED driver may be configured, as already indicated above, to control the DC bus voltage. In particular, the control unit may be configured to reduce the DC bus voltage, thus reducing the headroom of the LED driver, the headroom being the difference between the DC bus voltage and the output voltage Vf is reduced. By doing so, the efficiency of the back end module of the LED driver can be improved. When the headroom is reduced, and e.g. also the switching frequency, the required duty cycle D, required to obtain the required supply current to the load, will increase. As such, one can only reduce the headroom and/or the switching frequency until the duty cycle Dmax reaches an upper obtainable limit. In principle, the maximum attainable duty cycle would be 100%. In practice, a typical upper limit for the duty cycle may e.g. be 95% or 99%.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:
1. An LED driver comprising:
   a back end module BE comprising a switch mode power converter SMPS configured to operate in a self-oscillating current control mode, the back end module BE further comprising:
   an input terminal configured to receive a DC bus voltage;
   an output terminal configured to output an LED supply current for powering an LED fixture;

a control unit configured to:
receiving an input signal representative of a desired current value for the LED supply current for powering the LED fixture;
control the switch mode power converter SMPS to operate in the self-oscillating current control mode, based on the input signal;
wherein the control unit is further configured to control the back end module to operate the SMPS in a voltage control mode by:
determining a switching frequency of a switch of the SMPS when operating in the self-oscillating current control mode;
determining a minimal switching frequency of the switching frequency of the SMPS; wherein the control unit is further configured to control the switch of the SMPS in the voltage control mode by:
operating the switch of the SMPS at a substantially constant frequency based on the determined minimal switching frequency and
modulating a duty cycle of the switch to maintain the LED supply current at the desired current value.

2. The LED driver according to claim 1, wherein determining a switching frequency of the SMPS comprises detecting the switching frequency of the SMPS when operating in the self-oscillating current control mode.

3. The LED driver according to claim 1, wherein determining a switching frequency of the SMPS comprises observing the switching frequency of the SMPS when operating in the self-oscillating current control mode and identifying the minimal switching frequency.

4. The LED driver according to claim 1, wherein the control unit is configured to:
receive a voltage signal representative of the DC bus voltage, and
modulate the duty cycle of the switch based on the voltage signal.

5. The LED driver according to claim 4, further comprising a voltage divider for generating the voltage signal.

6. The LED driver according to claim 4, wherein the control unit is configured to receive a further voltage signal representative of a forward voltage of the LED fixture.

7. The LED driver according to claim 6, further comprising a further voltage divider for generating the further voltage signal.

8. The LED driver according to claim 1, further comprising:
a front end module FE configured to convert a mains supply voltage to the DC bus voltage.

9. The LED driver according to claim 1, wherein the substantially constant frequency corresponds to the minimal switching frequency or is lower than the minimal switching frequency.

10. The LED driver according to claim 1, wherein the SMPS comprises a comparator circuit for operating the switch of the SMPS, the comparator circuit being configured to receive a first signal representing the desired current value and a second signal representing an actual current value.

11. The LED driver according to claim 8, wherein the front end module FE comprises:
a rectifier for rectifying the mains supply voltage and output a rectified AC voltage and
a PFC circuit configured to convert the rectified AC voltage to the DC bus voltage.

12. The LED driver according to claim 1, wherein the modulation of the duty cycle is based on a mathematical model of the back end module BE.

13. The LED driver according to claim 12, wherein the mathematical model is stored in the control unit.

14. The LED driver according to claim 12, wherein the mathematical model is accessible to the control unit via a communication link.

15. The LED driver according to claim 8, wherein the control unit is further configured to control the DC bus voltage generated by the front end module FE.

16. The LED driver according to claim 15, wherein the control unit is configured to reduce the DC bus voltage and further reduce the substantially constant switching frequency.

17. The LED driver according to claim 1, wherein the control unit is configured to:
determine a variation of the switching frequency of the SNIPS and a period of the variation;
subdivide the period into sub-periods;
determine for each sub-period a duty-cycle at which to operate the switch of the SMPS;
and wherein the step of modulating the duty cycle of the SMPS comprises modulating the duty cycle in accordance with the determined duty-cycles in each sub-period.

18. The LED driver according to claim 17, wherein the duty-cycles in each sub-period are determined based on a mathematical model of the SMPS.

19. The LED driver according to claim 17, further comprising:
measuring a current level as supplied by the SMPS during each sub-period and
adjusting the duty cycle during one or more sub-periods if the current level during the sub-periods differs from a desired current level.

20. The LED driver according to claim 1, wherein the control unit is configured to operate the LED driver in the voltage control mode when predefined conditions are met.

21. The LED driver according to claim 20, wherein the predefined conditions comprise the absence of a different desired current value or a different input signal, during a predetermined period.

22. The LED driver according to claim 20, wherein the predefined conditions comprise the receipt of a user command to operate the LED driver in the voltage modulation mode.

23. A method of operating an LED driver, the LED driver comprising a back end module comprising a switched mode power converter SMPS, the back end module being configured to receive, at an input terminal, a DC bus voltage and configured to output, via an output terminal, a supply current for powering an LED fixture, the method comprising:
observing a switching frequency of the SMPS when operating in a self-oscillating current control mode and identifying a minimal switching frequency and a current level of the supply current supplied via the output terminal;
controlling the switching frequency of the SMPS to a substantially constant switching frequency based on the minimal switching frequency and modulating a duty cycle of the SMPS, so as to maintain the supply current as supplied by SMPS to the current level.

24. The method according to claim 23, wherein the step of observing the switching frequency comprises:
determining a variation of the switching frequency of the SMPS and a period of the variation;

subdividing the period into sub-periods;
determining for each sub-period a duty-cycle at which to operate the switch of the SMPS;
and wherein the step of modulating the duty cycle of the SMPS comprises modulating the duty cycle in accordance with the determined duty-cycles in each sub-period.

25. The method according to claim 24, wherein the duty-cycles in each sub-period are determined based on a mathematical model of the SMPS.

26. The method according to claim 23, further comprising:
measuring a current level as supplied by the SMPS during each sub-period and
adjusting the duty cycle during one or more sub-periods if the current level during the sub-periods differs from a desired current level.

27. The method according to claim 23, wherein the LED driver further comprises a front end module for generating the DC bus voltage, the method further comprising:
controlling the DC bus voltage down until the minimal switching frequency or the duty cycle at the minimal switching frequency reach a predetermined boundary.

28. The method according to claim 27, wherein the step of controlling the DC bus voltage down is applied before the step of controlling the switching frequency.

* * * * *